United States Patent
Yan et al.

(10) Patent No.: US 10,512,026 B2
(45) Date of Patent: Dec. 17, 2019

(54) TECHNIQUE FOR MEDIATION IN A RESIDENTIAL NETWORK

(71) Applicant: ORANGE, Paris (FR)

(72) Inventors: Han Yan, Cesson Sevigne (FR); Fabrice Fontaine, Geveze (FR)

(73) Assignee: Orange, Paris (FR)

( * ) Notice: Subject to any disclaimer, the term of this patent is extended or adjusted under 35 U.S.C. 154(b) by 337 days.

(21) Appl. No.: 15/310,384

(22) PCT Filed: May 22, 2015

(86) PCT No.: PCT/FR2015/051365
§ 371 (c)(1),
(2) Date: Nov. 10, 2016

(87) PCT Pub. No.: WO2015/181478
PCT Pub. Date: Dec. 3, 2015

(65) Prior Publication Data
US 2017/0150422 A1    May 25, 2017

(30) Foreign Application Priority Data
May 30, 2014 (FR) ..................... 14 54940

(51) Int. Cl.
*H04W 48/08* (2009.01)
*H04L 29/08* (2006.01)
(Continued)

(52) U.S. Cl.
CPC ......... *H04W 48/08* (2013.01); *H04L 12/2803* (2013.01); *H04L 41/20* (2013.01); *H04L 67/2861* (2013.01)

(58) Field of Classification Search
CPC .... H04W 48/08; H04L 12/2803; H04L 41/20; H04L 67/2861
See application file for complete search history.

(56) References Cited

U.S. PATENT DOCUMENTS 9,191,305 B2 * 11/2015 Klein ................. H04L 45/12
9,521,703 B2 * 12/2016 Egan .................. H04W 88/06
(Continued)

FOREIGN PATENT DOCUMENTS

| EP | 2 670 092 A2 | 4/2013 |
|---|---|---|
| WO | 2005117389 A1 | 12/2005 |

OTHER PUBLICATIONS

Attached please find the Written Opinion for the PCT/FR2015/051365 application.

*Primary Examiner* — Duc C Ho
(74) *Attorney, Agent, or Firm* — Haverstock & Owens LLP (57) ABSTRACT

The invention relates to a mediation technique carried out by a first device in a residential network. In said residential network, a software abstraction module offering an abstraction service of a technique for controlling access to the underlying media is executed by the first device. The first device receives a request to join the residential network from a second device via a wireless communication channel and verifies whether the second device is capable of executing the abstraction software module. When the second device is incapable of executing said software module, the first device allocates an address identifying the second device in the residential network according to a format compatible with the execution of the software module and executes the software abstraction module as a proxy of the second device.

16 Claims, 3 Drawing Sheets

(51) Int. Cl.
*H04L 12/28* (2006.01)
*H04L 12/24* (2006.01)

(56) References Cited

U.S. PATENT DOCUMENTS

| | | | |
|---|---|---|---|
| 2010/0161823 A1 | 6/2010 | Jung et al. | |
| 2012/0239744 A1* | 9/2012 | Yonge, III | H04L 12/4633 709/204 |
| 2013/0007855 A1* | 1/2013 | Bennett | H04B 3/54 726/5 |
| 2015/0382274 A1* | 12/2015 | Logvinov | H04L 41/0833 370/311 |

* cited by examiner

TECHNIQUE FOR MEDIATION IN A RESIDENTIAL NETWORK

The invention relates to the general field of telecommunications.

The invention relates more particularly to a technique of mediation implemented by a mediation device in a residential network.

A residential network comprises equipment or devices located on a customer site. These devices are also called CPE, for "Customer Premises Equipment". For a local area network, this notably means the access gateway, a "Set-Top Box" TV decoder, a mobile terminal. In the context of a home automation network, this also refers to domestic appliances, alarm systems, and sensors. An access gateway enables the devices of the residential network to access a WAN ("Wide Area Network"), such as the Internet network.

The IEEE, or "Institute of Electrical and Electronics Engineers", has defined a standard called IEEE 1905.1 aimed at unifying the various network technologies that may be found within the same residential network by means of a common software layer. It is designed to enable applications and high-level protocols to be independent of the underlying residential network technologies. The IEEE 1905.1 standard provides for three types of wired technologies: Ethernet IEEE 802.3, transmission of data over power lines IEEE 1901 (e.g. HomePlug®, Alliance HD-PLC) or over coaxial cable Multimedia over Coax (MoCA®). The IEEE 1905.1 standard provides for a single type of wireless technology: IEEE 802.11 (Wi-Fi). The common software layer AL, or "Abstraction Layer", also called a "convergence layer", is positioned between the network layer and the data link MAC ("Media Access Control") layer. This layer enables devices to exchange CMDU ("Control Message Data Unit") control messages. Thus, devices comprising this software layer and accessing the residential network by means of different network technologies and underlying media access control technologies can communicate with each other.

The IEEE 1905.1 standard notably provides mechanisms for discovering the topology of the devices in the residential network by means of CMDU control messages. Discovering the topology can be used to identify which network connections are shared between multiple devices and to obtain metrics such as the total bandwidth and the occupation rate of this bandwidth on the various network connections. It is, for example, possible to detect that data in a TV stream between the TV decoder and the access gateway is routed via PLC ("Power Line Carrier") plugs. At the level of the IP ("Internet Protocol") protocol layer, it is not possible to detect the presence of these plugs in the data routing. The IEEE 1905.1 standard also enables a data stream to be switched from a first path to a second path, e.g. in the event of degradation of the first path, and thus the robustness of data transmission in the residential network is increased. The overall capacity of the residential network may also be increased by a distribution of the various streams to be routed over the various available connections.

It should be noted that only one wireless technology associated with a media access control technique is currently provided in the IEEE 1905.1 standard. However, many devices are currently available to be integrated in a residential network and some of them have a different wireless technology. Illustrative examples are ZigBee, RFID ("Radio Frequency Identification"), DECT ULE ("Digital Enhanced Cordless Telephone Ultra Low Energy") or BLE ("Bluetooth Low Energy") technologies. The software layer AL is therefore not provided in this type of device.

It is thus impossible to benefit from the advantages conferred by the IEEE 1905.1 standard, notably at the abstraction level offered with regard to underlying network technologies allowing, in particular, a complete view of the topology of the residential network to be obtained. One of the purposes of the invention is to overcome the shortcomings/drawbacks of the prior art and/or to make improvements thereto.

According to a first aspect, the subject matter of the invention is a mediation method implemented by a first device in a residential network. A software abstraction module offering an abstraction service of a technique for controlling access to the underlying media is executed by the first device. The method comprises the steps of:
  receiving a request to join the residential network from a second device via a wireless communication channel;
  verifying whether the second device is capable of executing the software abstraction module;
  when the second device is not capable of executing said software module, execution of the software abstraction module by the first device as a proxy of the second device.

Thus, thanks to the mediation device acting as a proxy of a non-compliant device, the device that is not compatible with the underlying network technologies defined by the IEEE 1905.1 standard may be integrated into the residential network compliant with this standard and thus benefit from the advantages conferred by this standard.

Only the mediation device acting as the proxy of the non-compliant device is modified for implementing the method. The other devices of the IEEE 1905.1 residential network are not modified and may exchange data with the non-compliant device via the mediation device.

Any underlying network technology not supported by the IEEE 1905.1 standard and the associated technology for controlling access to the media may be supported in the network. This may be ZigBee, RFID, DECT ULE, BLE, etc.

Support for new network technologies in the IEEE 1905.1 standard is thus facilitated without the need for significant modifications to the standard.

The various embodiments or features mentioned below may be added independently or in combination with each other, to the steps of the mediation method as previously defined.

It has further been noted by the inventors that the IEEE 1905.1 standard provides a MAC address identifying a device according to a particular format of 48 bits. However, many devices that it would be desirable to integrate into the IEEE 1905.1 network do not have the required underlying network technology and in addition are identified by a MAC address of a different length, e.g. 16 or 64 bits.

In a particular embodiment, the method further comprises a step of allocating an address identifying the second device in the residential network according to a format compatible with the execution of the software module, prior to said execution of the software module as a proxy of the second device.

Thus, the integration of the non-compliant device is facilitated thanks to the allocation of an address in a format compatible with the IEEE 1905.1 standard. The mediation device then implements a translation function between the original address identifying the non-compliant device and the allocated address. The use of a compliant allocated address means the devices compliant with the IEEE 1905.1 standard do not have to be modified.

In a particular embodiment, when a third device requesting to join the residential network is capable of executing the software abstraction module, the method further comprises a step of verifying that an address identifying the third device in the residential network is distinct from the address allocated to the second device.

An address conflict may occur when a new device requests to join the residential network. The verification thus detects a possible address conflict.

According to a particular feature, the new device is not authorized to join the residential network.

Alternatively, according to a particular feature, when a third device requesting to join the residential network is capable of executing the software abstraction module, the method further comprises a step of verifying that an address identifying the third device in the residential network is distinct from the address allocated to the second device, and if not, a step of allocating a new address to the second device.

Thanks to the allocation of a new address, the non-compliant device may continue to be integrated into the residential network and the new device may join the network.

According to a particular feature, the allocated new address is used during the execution of the software module as a proxy of the second device.

The address which had been allocated in the first instance to the non-compliant device is no longer used for identifying it.

According to a particular feature, the allocated new address is broadcast to the third device.

This allows the residential network devices to be informed, which can then update the topology information of the network and communicate with the non-compliant device by means of the allocated new address.

Alternatively, data received by the first device intended for a device identified by said address is duplicated to the second and third devices.

The mediation device thus has the guarantee that the data intended for one of the two devices, the device that has generated the conflict and the non-compliant device, will actually arrive at the destination.

According to a second aspect, the invention also relates to a mediation device belonging to a residential network. This device comprises:
- a software abstraction module offering an abstraction service of a technique for controlling access to the underlying media;
- a receiving module, arranged for receiving a request to join the residential network from a second device via a wireless communication channel;
- a verification module, arranged for verifying whether the second device is capable of executing said software abstraction module;
- a control module, arranged for triggering an execution of the software abstraction module by the mediation device as a proxy of the second device, when the second device is not capable of executing said software abstraction module.

In a particular embodiment, the control module is also arranged for allocating an address for identifying the second device in the residential network according to a format compatible with the execution of the software abstraction module, prior to the execution of the software module as a proxy of the second device.

The advantages described for the mediation method according to the first aspect are directly transposable to the mediation device.

In a particular embodiment, the mediation device is further arranged for enabling access to a wide area network to at least one device of the residential network.

Such a device is an access gateway. The central position of the access gateway is thus advantageous, as a result of access to the wide area communication network.

According to a third aspect, the invention also relates to a residential network system comprising at least one mediation device according to the second aspect and a device comprising an interface module, arranged for sending and receiving data via the wireless communication channel.

The advantages described for the mediation method according to the first aspect are directly transposable to the residential network system.

According to a fourth aspect, the invention relates to a program for a mediation device, comprising program code instructions intended to control the execution of the steps of the mediation method according to the first aspect implemented by the mediation device, when this program is executed by this device and a recording medium readable by a device on which a program for a device is recorded.

The advantages described for the mediation method according to the first aspect are directly transposable to the program for a mediation device and to the recording medium.

The invention will be better understood with the aid of the following description of particular embodiments of the mediation technique, with reference to the accompanying drawings in which.

Figure 1:
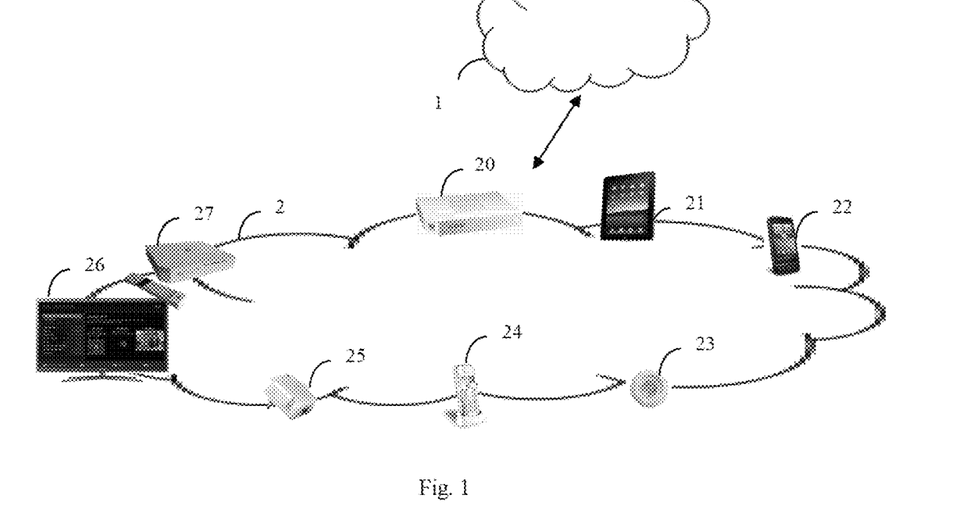
FIG. 1 represents a residential network in its environment according to a particular embodiment.

FIG. 1 represents, in its environment, a private or residential communication network 2. An access gateway 20 enables devices of the local area network 2 to access a WAN ("Wide Area Network") 1, such as the Internet network.

The residential network is based on various network technologies, such as an Ethernet wired network according to the IEEE 802.3 standard, a Wi-Fi wireless network according to the IEEE 802.11 standard or a PLC power line carrier network (e.g. HomePlug®, Alliance HD-PLC) according to the IEEE 1901 standard, or even a MoCA® ("Multimedia over Coax") coaxial cable network. A technique for controlling access to the media is associated with the network technique. To support these various network technologies, the access gateway 20 comprises a software layer compliant with the IEEE 1905.1 standard for unifying access to these various network technologies. This software abstraction layer offers an abstraction service of a technology for controlling access to the underlying media.

The IEEE 1905.1 standard was published in April 2013 and is beginning to be implemented in various equipment in the digital domestic environment under the commercial name nVoy.

The devices of the local area network 2 may be any devices, e.g. domestic devices, featuring a wired or wireless network connection. These may be, for example, a touch tablet 21, a mobile phone 22, a sensor 23, a fixed telephone 24, a PLC plug 25, a television 26, a TV decoder 27 ("Set-Top Box"), a games console, household appliances, etc.

Subsequently, the particular case is considered in which all the devices of the local area network 2 are compliant with the IEEE 1905.1 standard, with the exception of the device 23.

This device 23 has a communication interface based on a network technology not supported by the IEEE 1905.1 standard. It may be, for example, the ZigBee protocol, as defined by the ZigBee Alliance. The ZigBee protocol is a high level protocol based on the IEEE 802.15.4 standard for the lower layers. There is no limitation attached to this particular technology. It may also be RFID ("Radio Frequency Identification"), DECT ULE ("Digital Enhanced Cordless Telecommunications Ultra Low Energy") or BLE ("Bluetooth Low Energy"), etc.

This device 23 is, for example, a presence detection sensor.

Figure 3A:
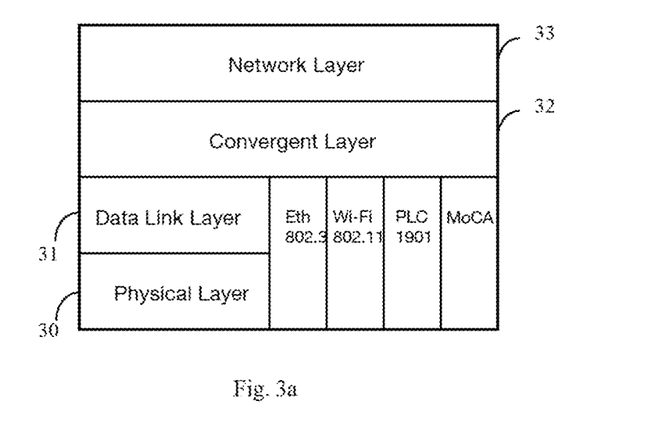
FIGS. 3a-3c schematically represent protocol layers of residential network devices according to a particular embodiment.

FIG. 3a represents the structure in the form of OSI layers of one of the devices 21-22, 24-27 of the residential network 2. A first layer 30 of OSI Level 1 corresponds to the physical layer. It is based on the network technologies previously described (Ethernet, Wi-Fi, PLC, MoCA). It is emphasized here that it is not necessary for this device to be capable of implementing all these network technologies. Only one of them may be sufficient if there are bridge insert devices. A second layer 31 of OSI Level 2 corresponds to the MAC ("Media Access Control") layer. A third layer 32 of intermediate level between OSI Level 2 and OSI Level 3 (also misnamed the OSI Level 2.5 layer) corresponds to the convergence software layer or "Abstraction Layer", as defined in the IEEE 1905.1 standard. This third software layer 32 offers an abstraction service of a technology for controlling access to the underlying media and enables the devices on the local area network to exchange particular messages by means of the second layer 31 during the execution of a software abstraction module. These particular messages are CMDU "Control Message Data Units". These control messages enable devices that do not have the same physical layer 30 to communicate with each other without needing an IP ("Internet Protocol") layer. It is thus possible to detect that a TV stream between the TV decoder 27 and the access gateway 20 passes through the PLC plug 25, for example, which is not visible at the IP level. A fourth layer 33 of OSI Level 3 corresponds to the network layer.

The CMDU control messages notably enable these devices to obtain the topology of the residential network 2 and to access performance metrics on this network, e.g. the bandwidth and/or the usage rate of this bandwidth on each link or segment of the network. Different types of CMDU control messages are provided:
 a "Discovery" message, for detecting the directly neighboring devices supporting the IEEE 1905.1 standard;
 a "Notification" message, for informing the devices of a change in topology;
 a "Query" message, for obtaining the topological database of another device via a "Response" message.

For identifying the devices that support the IEEE 1905.1 standard the convergence software layer uses a unique address in the EUI48™, "Extended Unique Identifier-48", format. This EUI-48 address is 48 bits long and comprises a unique identifier of an organization (in 24 bits) and an identifier of the device (also in 24 bits). Thus, each device 21-22, 24-27 of the residential network 2 is identified by a unique 48-bit long address.

Figure 3B:
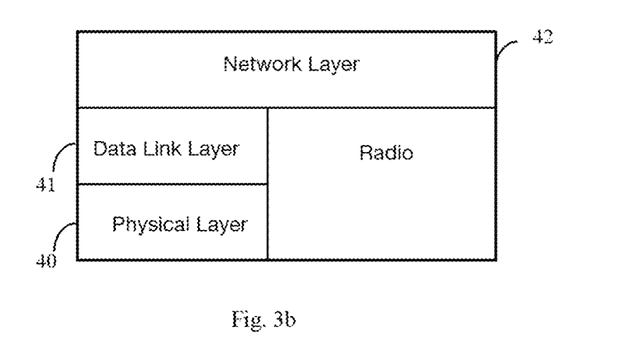

FIG. 3b represents the structure in the form of OSI layers of the device 23, not supporting the IEEE 1905.1 standard. A first layer 40 of OSI Level 1 corresponds to the physical layer. It is based on a network technology not supported by the IEEE 1905.1 standard, e.g. ZigBee. A second layer 41 of OSI Level 2 corresponds to the media access control or MAC layer. A third layer 42 of OSI Level 3 corresponds to the network layer. The device 23 is identified by an address the format of which depends on the network technology supported by this device. Thus, when this network technology is ZigBee, the MAC address may be 16 (short address) or 64 bits (extended address) long.

Figure 3C:
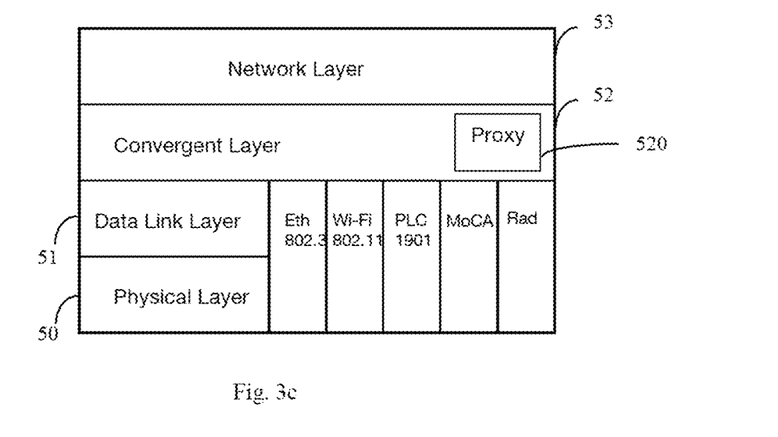

FIG. 3c represents the structure in the form of OSI layers of the access gateway 20. A first layer 50 of OSI Level 1 corresponds to the physical layer. It is based on the network technologies previously described (Ethernet, Wi-Fi, PLC, MoCA). A second layer 51 of OSI Level 2 corresponds to the media access control or MAC layer. A third layer 52 of intermediate level between OSI Level 2 and OSI Level 3 corresponds to the software abstraction layer, as defined in the IEEE 1905.1 standard. This third software layer 52 enables the access gateway to exchange CMDU control messages with the devices of the local area network during the execution of a software abstraction module. In a particular embodiment, the third software layer 52 comprises a proxy software module 520 used for executing the software abstraction module as a proxy of a device not compliant with the IEEE 1905.1 standard, e.g. the device 23. A fourth layer 53 of OSI Level 3 corresponds to the network layer. The access gateway 20 is also identified by a unique EUI-48 48-bit long address.

The proxy software module 520 is provided in this particular embodiment at the level of the access gateway 20. This implementation at the level of the access gateway 20 is advantageous because of the privileged situation of the access gateway 20 in the residential network 2. However, there is no limitation attached to this location. In another embodiment, the proxy software module is provided at the level of one of the other devices 21-22, 24-27 of the residential network 2.

The mediation technique provides for implementing a mediation device enabling devices not compliant with the IEEE 1905.1 standard to join the residential network. In a particular embodiment, their MAC addresses are also not compliant with what is expected in the IEEE 1905.1 standard and are supported by the mediation device.

A description will now be given of the mediation technique in a particular embodiment, as implemented by the access gateway 20 in relation to FIGS. 2a and 2b. It is recalled that in the embodiment described here the access gateway 20 comprises a proxy software module 520 enabling an execution of the software layer 52 as a proxy of a device not compliant with the IEEE 1905.1 standard. The description is applicable to any mediation device, capable of acting as a proxy device.

Figure 2A:
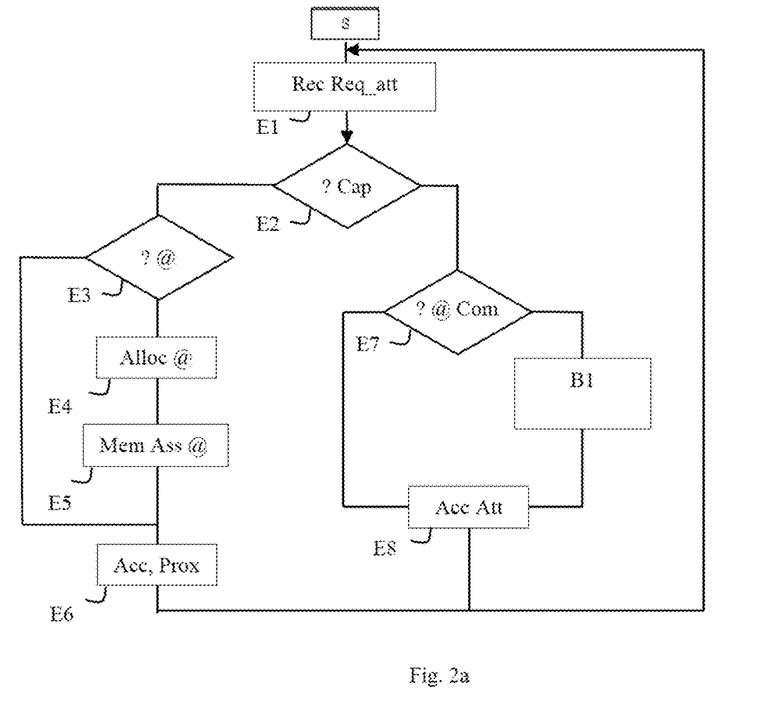
FIGS. 2a-2b illustrate steps of a mediation method according to a particular embodiment.
Figure 2B:
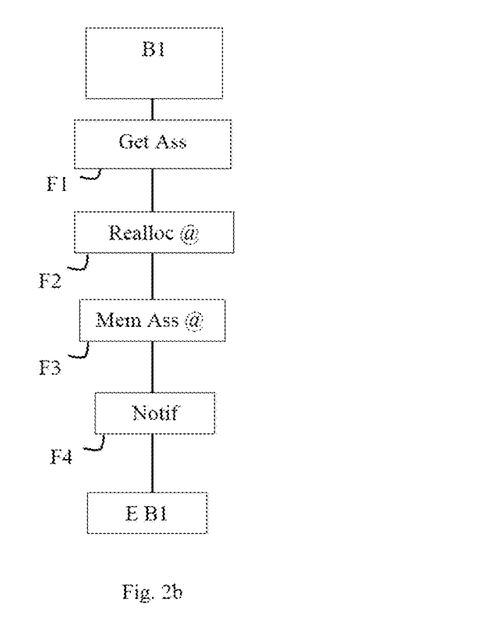

FIG. 2a represents steps implemented by the access gateway 20 when a device requests to join the residential network 2.

The access gateway 20 implements a wait loop for detecting whether a device is requesting to join the network 2.

In a step E1, the access gateway 20 receives a request to join the residential network 2 from a device via a wireless communication channel.

When the device is compliant with the IEEE 1905.1 standard, this request corresponds to a CMDU "Notification" control message. This request is, for example, sent by one of the devices 21-22, 24-27 previously described.

When the device is not compliant with the IEEE 1905.1 standard, this request corresponds, for example, to a "Route Request" discovery message RREQ according to the AODV, "Ad hoc On Demand Distance Vector", routing protocol. This request is, for example, sent by the device 23 previously described.

In a step E2, the access gateway 20 verifies whether the device requesting to join the network 2 is capable of executing the software abstraction layer. More precisely, this means verifying whether or not the request received in step E1 is a CMDU control message.

When the device 23 is not capable of executing the software abstraction layer AL, the access gateway 20 will then execute (step E6) the software layer AL as a proxy of the device 23, by means of the proxy software module 520. The access gateway 20 thus contributes to the integration of the device 23 into the residential network 2 by broadcasting CMDU control messages relating to the device 23. The device 23 is then accessible to other devices compliant with the IEEE 1905.1 standard via the access gateway 20. The access gateway 20 implements a translation function between the original address identifying the non-compliant device 23 and the allocated address. Data received by the access gateway 20 intended for the device 23 identified by the allocated MAC address are transmitted thereto. Conversely, the access gateway 20 serves as a relay for transmitting data sent out by the device 23 to the devices 21-22, 24-27 compliant with the IEEE 1905.1 standard. Thus, by implementing a proxy software module, a device compliant with the IEEE 1905.1 standard may act as proxy for a non-compliant device. The non-compliant device is thus visible to other devices on the network 2. An overall view of the topology of the network 2 may thus be obtained by all the devices compliant with the IEEE 1905.1 standard.

When the device 21-22, 24-27 is capable of executing the software layer AL, in a step E8, the access gateway 20 stores the information received from this device in a topology database.

Next, the case is considered of a particular embodiment comprising address management in the network 2, this embodiment hosting a device not compliant with the IEEE 1905.1 standard and identified by an address of a different format from EUI-48. For example, the device 23, not compliant with the IEEE 1905.1 standard, has a MAC address identifying it, which is not coded in 48 bits in accordance with the EUI-48 format. This MAC address is termed the original address and denoted hereafter as MAC_Ori.

In this case, when in step E2, it has been verified that the device 23 is not capable of executing the software layer AL, in a step E3, the access gateway 20 verifies whether the device not compliant with the IEEE 1905.1 standard has a 48-bit address in the EUI-48 format. When this is not the case, in an allocation step E4, the access gateway 20 allocates an address identifying the device 23 in the network 2 according to a format compatible with the execution of the software layer. More precisely, it is a MAC EUI-48 address, hereafter denoted as MAC_Gen. This MAC_Gen address is selected so that it does not coincide with an address identifying one of the devices of the network 2. It may be assigned in a random manner, generated from the MAC_Ori address by truncation or by extension. There is no limitation associated with the manner in which this MAC_Gen address is created.

In a step E5, the access gateway 20 stores an association between the MAC_Ori original address and the MAC_Gen address allocated to the device 23.

In step E6, the access gateway 20 executes the software layer AL as a proxy of the device 23 and by using the MAC_Gen address allocated to the device 23.

The access gateway 20 then returns to waiting to receive a request from a device to join the network 2. It has thus been possible to integrate into the residential network a device not compliant with the IEEE 1905.1 standard and not having a MAC address compliant with this standard.

Still in this particular embodiment, when in step E2 the access gateway 20 identifies that the device 21-22, 24-27 is capable of executing the software layer AL, in a step E7, the access gateway 20 verifies that there is no address conflict for the address identifying this device. This may notably be the case for a MAC_Gen address allocated in step E4, or reallocated during a step F2 described later, to a device not compliant with the IEEE 1905.1 standard and not having an EUI-48 address. Step E7 thus consists in verifying that the address identifying the device requesting to join is distinct from an address allocated to a device not compliant with the IEEE 1905.1 standard.

When there is no address conflict, the access gateway 20 implements step E8 previously described. The access gateway 20 then returns to waiting to receive a request from a device to join the network 2.

When there is an address conflict, the access gateway 20 implements a set of steps for reallocating an address to the device 23 not compliant with the IEEE 1905.1 standard. This set of steps will now be described in relation to FIG. 2b.

In a step F1, the access gateway 20 obtains the MAC_Ori original address associated with the address for which there is a conflict. This association has been stored by the access gateway 20 during the execution of step E5.

In step F2, the access gateway 20 allocates a new address MAC_Gen2 to the device identified by the MAC_Ori original address. This new allocation is performed in a similar way to the allocation made in step E4.

In a step F3, the access gateway 20 stores an association between the MAC_Ori original address and the MAC_Gen2 address allocated to the device 23 identified by the MAC_Ori original address.

In a step F4, the access gateway 20 notifies the devices compliant with the IEEE 1905.1 standard of the new MAC_Gen2 address allocated to the non-compliant device for which it acts as a proxy. More precisely, the access gateway 20 transmits a new CMDU control message MAC_Change_Request, indicating that the device identified by the MAC_Gen address is henceforth identified by the MAC_Gen2 address. A new type of CMDU message "Message Type" may be associated with this message. It is also possible to use a type of message indicating a message specific to a manufacturer with a "Message Type" taking the value 0x0004. This enables devices compliant with the IEEE 1905.1 standard to update the topology information that they have stored. Subsequently, during the execution of the software layer AL as a proxy of the device 23, the access gateway 20 uses the new MAC_Gen2 address allocated to the device 23.

The access gateway 20 then returns to waiting to receive a request from a device to join the network 2.

In a variant of this embodiment, once the new MAC_Gen2 address has been allocated (step F2) and the association stored (step F3), the access gateway 20 does not broadcast the new address but duplicates the data received for a device identified by the MAC_Gen address to the device 23 not compliant with the IEEE 1905.1 standard with which this address was previously associated and to the device 21-22, 24-27, for which the address conflict has been detected in step E7. In this variant, mistakenly received data is deleted by the application level of the device not concerned by this data.

As an illustrative example, a user, Romain, has a network compliant with the IEEE 1905.1 standard in his residence. This network comprises an access gateway and PLC plugs. Romain wants to add a computer PC1 to this network provided with an electronic key offering ZigBee access (ZigBee "dongle"), with a 16-bit MAC address 0x25F5. The access gateway detects that this computer PC1 is requesting to join the network. The access gateway then allocates a first MAC EUI-48 address 00-50-56-00-00-01 to it. The computer PCI can then communicate with the other devices present on the IEEE 1905 network. Later, another computer PC2 comprising an Ethernet interface, with a MAC address 00-50-56-00-00-01, joins the network. Thus there is an address conflict. The access gateway places this other computer PC2 on standby in order to manage the address conflict, by allocating a new address to the first computer PC1. Once the new address is allocated, the computer PC2 can communicate with the other devices on the IEEE 1905 network.

This new address may be notified to the other devices. In this case, the data intended for the computer PC1 is redirected to the allocated new address.

In the variant previously described, the data with the first MAC address as the destination address is directed both toward the first computer PC1 and toward the second computer PC2. The equipment not concerned does not then process this data and ignores, for example, a request aimed at browsing a list of multimedia files.

Figure 4:
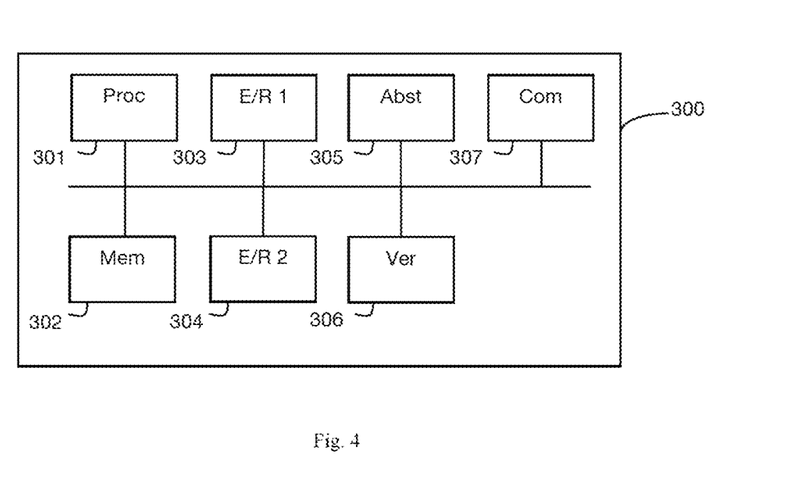
FIG. 4 represents a mediation device according to a particular embodiment.

A description will now be given of a mediation device 300 in a particular embodiment with reference to FIG. 4. Such a device notably comprises;
 a memory area 302 arranged for storing an application that comprises code instructions for implementing the steps of the mediation method, as previously described;
 a storage memory, not represented, arranged for storing data used during the implementation of the mediation method;
 a processor 301 for executing software module code instructions;
 a first interface module 303, arranged for sending and receiving data in accordance with a first network technology;
 a second interface module 304, arranged for sending and receiving data in accordance with a second radio network technology, notably for receiving a request to join the residential network from a second device via a wireless communication channel;
 a software abstraction module 305, corresponding to the software abstraction layer AL, arranged for offering an abstraction service of a technology for controlling access to the underlying media for the first interface module 303;
 a verification module 306, arranged for verifying whether the second device is capable of executing the software abstraction module;
 a control module 307, arranged for triggering an execution of the software abstraction module by the mediation device as a proxy of the second device, when the second device is not capable of executing the software abstraction module.

The software abstraction module 305 notably comprises the proxy software module 520 enabling an execution of the software abstraction layer as a proxy of a device not compliant with the IEEE 1905.1 standard.

The first interface module 303 is, for example, an Ethernet interface module, a WiFi radio interface module, or a PLC or MoCA interface module. In a particular embodiment, the mediation device comprises multiple first interface modules 303.

The second interface module 304 is, for example, a ZigBee radio interface module, not supported by the IEEE 1905.1 standard.

The storage memory is notably arranged for storing a topology database of the residential network as well as link metrics of the network.

The software module 305 being executed as a proxy of the second device is notably arranged for:
 routing data received by means of the second interface module 304 to its destination in the residential network or the wide area network, and vice versa;
 communicating topology control messages relating to the second device as well as link metrics messages.

In a particular embodiment, the control module 307 is also arranged for allocating an address identifying the second device in the residential network according to a format compatible with the execution of the software module 305, prior to the execution of the software module as a proxy of the second device, when this does not have a compliant address. In this embodiment, the software abstraction module 305 implements an address translation function by changing the original address identifying the second device into the address allocated in the received data and vice versa. The storage memory is then arranged for storing an association between the allocated address and the original address identifying the second device for the second interface module 304.

According to a particular feature, the verification module 306 is further arranged for verifying that an address identifying a third device requesting to join the residential network via the first interface module 303 is distinct from the address allocated to the second device. Otherwise, there is an address conflict.

According to a particular feature, the control module 307 is also arranged for allocating a new address to the second device in the event of address conflict.

In a particular embodiment, the control module 307 is arranged for ordering a broadcast of the allocated new address in the residential network.

According to a particular feature, the control module 307 is arranged for ordering a transmission of data intended for a device identified by the address that has triggered the address conflict to the second device by means of the second interface module 304 and to the third device by means of the first interface module 303.

The mediation technique is implemented by means of software and/or hardware components. In this context, the term "module" may correspond in this document both to a software component and to a hardware component or to a set of hardware and/or software components, capable of implementing a function or a set of functions, according to what has been previously described for the module concerned.

A software component is one or more computer programs, one or more subprograms of a program, or more generally any program or software element. Such a software component is stored in memory then loaded and executed by a data processor of a physical entity and is capable of accessing the hardware resources of this physical entity (memories, recording media, communication bus, input/output printed circuit boards, user interfaces, etc.).

Similarly, a hardware component is any element of a hardware assembly. This may be a programmable or non-programmable hardware component, with or without an integrated processor for executing software. It may be, for example, an integrated circuit, a smart card, a printed circuit board for executing firmware, etc.

In a particular embodiment, the modules 305, 306, 307 are arranged for implementing the mediation method previously described. They are preferably software modules comprising software instructions for executing the steps of the mediation method previously described, implemented by a mediation device. The invention therefore also relates to:

- a program for a mediation device, comprising program code instructions intended to control the execution of the steps of the mediation method previously described, when said program is executed by this mediation device;
- a recording medium readable by a mediation device on which the program for a mediation device is recorded.

The software modules may be stored in or transmitted by a data medium. This may be a hardware storage medium, e.g. a CD-ROM, a magnetic disk or a hard disk, or a transmission medium such as an electrical, optical or radio signal, or a telecommunication network.

The invention also relates to a residential network system comprising at least one mediation device as previously described and a device comprising an interface module, arranged for sending and receiving data according to the second radio network technology.

The invention claimed is:

1. A mediation method implemented by a first device in a residential network, a software abstraction module offering an abstraction service of a technique for controlling access to the underlying media being executed by the first device, said method comprising the steps of:
   receiving a request to join the residential network from a second device via a wireless communication channel;
   verifying whether the second device is capable of executing the software abstraction module;
   when the second device is not capable of executing said software abstraction module, allocating an address identifying the second device in the residential network according to a format compatible with the execution of the software abstraction module and execution of the software abstraction module by the first device as a proxy of the second device.

2. The mediation method as claimed in claim 1, when a third device requesting to join the residential network is capable of executing the software abstraction module, further comprising a step of verifying that an address identifying the third device in the residential network is distinct from the address allocated to the second device.

3. The mediation method as claimed in claim 1, when a third device requesting to join the residential network is capable of executing the software abstraction module, further comprising a step of verifying that an address identifying the third device in the residential network is distinct from the address allocated to the second device, and if not, a step of allocating a new address to the second device.

4. The mediation method as claimed in claim 3, in which the allocated new address is used during the execution of the software abstraction module as a proxy of the second device.

5. The mediation method as claimed in claim 4, comprising a step of broadcasting the allocated new address to the third device.

6. The mediation method as claimed in claim 3, in which data received by the first device intended for a device identified by said address is duplicated to the second and third devices.

7. A mediation device belonging to a residential network, said device comprising:
   a software abstraction module offering an abstraction service of a technique for controlling access to the underlying media;
   a receiving module, arranged for receiving a request to join the residential network from a second device via a wireless communication channel;
   a verification module, arranged for verifying whether the second device is capable of executing said software abstraction module;
   a control module, arranged for allocating an address for identifying the second device in the residential network according to a format compatible with the execution of the software abstraction module and for triggering an execution of the software abstraction module by the mediation device as a proxy of the second device, when the second device is not capable of executing said software abstraction module.

8. The mediation device as claimed in claim 7, further arranged for enabling access to a wide area network to at least one device of the residential network.

9. A residential network system comprising:
   at least one mediation device comprising:
      a software abstraction module offering an abstraction service of a technique for controlling access to the underlying media;
      a receiving module, arranged for receiving a request to join the residential network from a second device via a wireless communication channel;
      a verification module, arranged for verifying whether the second device is capable of executing said software abstraction module;
      a control module, arranged for allocating an address for identifying the second device in the residential network according to a format compatible with the execution of the software abstraction module and for triggering an execution of the software abstraction module by the mediation device as a proxy of the second device, when the second device is not capable of executing said software abstraction module; and
   a device comprising an interface module, arranged for sending and receiving data via the wireless communication channel.

10. A non-transitory computer-readable memory storing a program for a mediation device, the program comprising program code instructions intended to control execution of a mediation method, when said program is executed by said device, the mediation method implemented by a first device in a residential network, a software abstraction module offering an abstraction service of a technique for controlling access to the underlying media being executed by the first device, the mediation method comprising:
   receiving a request to join the residential network from a second device via a wireless communication channel;
   verifying whether the second device is capable of executing the software abstraction module;
   when the second device is not capable of executing said software abstraction module, allocating an address identifying the second device in the residential network according to a format compatible with the execution of the software abstraction module and execution of the software abstraction module by the first device as a proxy of the second device.

11. The non-transitory computer-readable memory as claimed in claim 10, when a third device requesting to join the residential network is capable of executing the software abstraction module, the mediation method further comprises verifying that an address identifying the third device in the residential network is distinct from the address allocated to the second device.

12. The non-transitory computer-readable memory as claimed in claim 10, when a third device requesting to join the residential network is capable of executing the software abstraction module, the mediation method further comprises verifying that an address identifying the third device in the residential network is distinct from the address allocated to the second device, and if not, allocating a new address to the second device.

13. The non-transitory computer-readable memory as claimed in claim 12, in which the allocated new address is used during the execution of the software abstraction module as a proxy of the second device.

14. The non-transitory computer-readable memory as claimed in claim 13, further comprising broadcasting the allocated new address to the third device.

15. The non-transitory computer-readable memory as claimed in claim 12, in which data received by the first device intended for a device identified by said address is duplicated to the second and third devices.

16. A non-transitory recording medium readable by a mediation device on which a program is recorded, the program comprising program code instructions intended to control execution of a mediation method, when said program is executed by said device, the mediation method implemented by a first device in a residential network, a software abstraction module offering an abstraction service of a technique for controlling access to the underlying media being executed by the first device, the mediation method comprising:
- receiving a request to join the residential network from a second device via a wireless communication channel;
- verifying whether the second device is capable of executing the software abstraction module;
- when the second device is not capable of executing said software abstraction module, allocating an address identifying the second device in the residential network according to a format compatible with the execution of the software abstraction module and execution of the software abstraction module by the first device as a proxy of the second device.

* * * * *